(12) United States Patent
Heiskanen

(10) Patent No.: US 12,066,870 B2
(45) Date of Patent: Aug. 20, 2024

(54) PLATE ARRANGEMENT AND CHAIN HINGE ASSEMBLY COMPRISING A PLATE ARRANGEMENT

(71) Applicant: Huawei Technologies Co., Ltd., Shenzhen (CN)

(72) Inventor: Juuso Heiskanen, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 573 days.

(21) Appl. No.: 17/267,219

(22) PCT Filed: Aug. 10, 2018

(86) PCT No.: PCT/EP2018/071719
§ 371 (c)(1),
(2) Date: Feb. 9, 2021

(87) PCT Pub. No.: WO2020/030280
PCT Pub. Date: Feb. 13, 2020

(65) Prior Publication Data
US 2021/0311530 A1 Oct. 7, 2021

(51) Int. Cl.
*G06F 1/16* (2006.01)
*F16C 11/04* (2006.01)
*H04M 1/02* (2006.01)

(52) U.S. Cl.
CPC .......... *G06F 1/1681* (2013.01); *F16C 11/045* (2013.01); *H04M 1/0268* (2013.01)

(58) Field of Classification Search
CPC .... G06F 1/1681; G06F 1/1616; G06F 1/1652; F16C 11/045; H04M 1/0268; H04M 1/022
See application file for complete search history.

(56) References Cited

U.S. PATENT DOCUMENTS 8,125,759 B2 * 2/2012 Fukuma ................ F16M 13/00
361/260
9,071,673 B2 6/2015 Choi et al.
9,176,535 B2 * 11/2015 Bohn .................... G06F 1/1681
(Continued)

FOREIGN PATENT DOCUMENTS

CN 101840247 A 9/2010
CN 103620516 A 3/2014
(Continued)

*Primary Examiner* — Anthony M Haughton
*Assistant Examiner* — Theron S Milliser
(74) *Attorney, Agent, or Firm* — Conley Rose, P.C.

(57) ABSTRACT

A plate arrangement for change of direction in a chain hinge assembly, the plate arrangement comprising a first hinge plate comprising one center pivot axis, and a second hinge plate comprising a center pivot axis and two end pivot axes, the end pivot axes being arranged at opposite sides of the center pivot axis. The first hinge plate and the second hinge plate are pivotally interconnected such that the center pivot axis of the first hinge plate coincides with the center pivot axis of the second hinge plate. The end pivot axes of the second hinge plate are adapted for pivotally connecting to first and second further elements such that the further elements may pivot in a direction which is opposite of a pivoting direction of the first hinge plate, in relation to the second hinge plate.

20 Claims, 4 Drawing Sheets

(56) References Cited

U.S. PATENT DOCUMENTS

| | | | |
|---|---|---|---|
| 9,348,450 B1 | 5/2016 | Kim | |
| 9,557,771 B2 | 1/2017 | Park et al. | |
| 9,625,947 B2* | 4/2017 | Lee | G06F 1/1616 |
| 9,668,550 B2* | 6/2017 | Seo | A44C 5/08 |
| 9,869,114 B1* | 1/2018 | Hung | G06F 1/1681 |
| 9,898,051 B2* | 2/2018 | Cho | G06F 1/1652 |
| 10,178,765 B2* | 1/2019 | Fan | G06F 1/1652 |
| 10,185,364 B2* | 1/2019 | Seo | G06F 1/1635 |
| 10,231,347 B2* | 3/2019 | Seo | H05K 5/0013 |
| 10,345,853 B2* | 7/2019 | Wu | G06F 3/14 |
| 10,599,189 B1* | 3/2020 | Hsu | G06F 1/1681 |
| 10,684,657 B2* | 6/2020 | Lin | G06F 1/1616 |
| 10,975,603 B2* | 4/2021 | Tazbaz | G06F 1/1616 |
| 11,503,728 B2* | 11/2022 | Sun | E05D 3/122 |
| 11,553,612 B2* | 1/2023 | Chen | H04M 1/022 |
| 2010/0232100 A1 | 9/2010 | Fukuma et al. | |
| 2012/0264489 A1 | 10/2012 | Choi et al. | |
| 2012/0307423 A1 | 12/2012 | Bohn et al. | |
| 2013/0037228 A1 | 2/2013 | Verschoor et al. | |
| 2015/0089974 A1* | 4/2015 | Seo | A44C 5/0076 63/1.13 |
| 2015/0361696 A1 | 12/2015 | Tazbaz | |
| 2016/0116944 A1 | 4/2016 | Lee et al. | |
| 2016/0357222 A1 | 12/2016 | Seo et al. | |
| 2017/0094775 A1* | 3/2017 | Fan | H05K 1/028 |
| 2017/0235343 A1* | 8/2017 | Cho | G06F 1/1681 361/679.27 |
| 2017/0277225 A1 | 9/2017 | Yeom | |
| 2018/0049329 A1 | 2/2018 | Seo et al. | |
| 2018/0239401 A1* | 8/2018 | Lin | E05D 11/06 |
| 2019/0050023 A1* | 2/2019 | Wu | A44C 5/0061 |
| 2019/0145457 A1* | 5/2019 | Hsu | F16C 11/04 16/368 |
| 2021/0037664 A1* | 2/2021 | Sun | H05K 5/0226 |
| 2021/0207648 A1* | 7/2021 | Chen | H05K 5/0226 |
| 2023/0016073 A1* | 1/2023 | Sun | G06F 1/1615 |

FOREIGN PATENT DOCUMENTS

| | | |
|---|---|---|
| CN | 105549682 A | 5/2016 |
| CN | 108167316 A | 6/2018 |
| EP | 3015947 A1 | 5/2016 |
| KR | 20100079459 A | 7/2010 |
| KR | 20110100936 A | 9/2011 |
| KR | 20130073331 A | 7/2013 |
| KR | 101487189 B1 | 1/2015 |
| KR | 20150037383 A | 4/2015 |

* cited by examiner

PLATE ARRANGEMENT AND CHAIN HINGE ASSEMBLY COMPRISING A PLATE ARRANGEMENT

CROSS-REFERENCE TO RELATED APPLICATIONS

This application is a U.S. National Stage of International Patent Application No. PCT/EP2018/071719 filed on Aug. 10, 2018, which is hereby incorporated by reference in its entirety.

TECHNICAL FIELD

The disclosure relates to a plate arrangement for change of direction in a chain hinge assembly, as well as a bi-directional chain hinge assembly. The bi-directional chain hinge assembly comprises such a plate arrangement as well as a first row of hinge plates and a second row of hinge plates being offset in relation to the first row of hinge plates such that a hinge plate of the second row partially overlaps a hinge plate of the first row.

BACKGROUND

The size of electronic devices, such as tablets and mobile phones, is an important consideration when designing electronic devices. The user oftentimes requests the outer dimensions of the device to be as small as possible while still providing an as large as possible display.

This problem may be solved by means of a foldable electronic device such as that of U.S. Pat. No. 9,071,673, which discloses an electronic device comprising multiple housings interconnected by means of hinges and covered by one large display. The multiple housings, and the display, can be folded together to provide an as small device as possible, and unfolded to provide an as large display as possible.

The multiple housings are connected by means of hinge modules, which are configured to fold the multiple housings in such a way that the display is invisible, and hence the electronic device unusable, when the electronic device is in a folded configuration. Furthermore, the hinge modules of U.S. Pat. No. 9,071,673 are bulky, complex, and comparatively heavy.

SUMMARY

It is an object to provide an improved concept for a foldable electronic device. The foregoing and other objects are achieved by the features of the independent claims. Further implementation forms are apparent from the dependent claims, the description, and the figures.

According to a first aspect, there is provided a plate arrangement for change of direction in a chain hinge assembly, the plate arrangement comprising a first hinge plate comprising a (e.g. one) center pivot axis, and a second hinge plate comprising a center pivot axis and two end pivot axes, the end pivot axes being arranged at opposite sides of the center pivot axis, the first hinge plate and the second hinge plate being pivotally interconnected such that the center pivot axis of the first hinge plate coincides with the center pivot axis of the second hinge plate, the end pivot axes of the second hinge plate being adapted for pivotally connecting to first and second further elements such that the first further element and the second further element may pivot in a direction which is opposite to a pivoting direction of the first hinge plate, in relation to the second hinge plate.

This solution allows for elements, interconnected by the plate arrangement, to be pivoted in the same direction, and hence the chain hinge assembly to change direction such that the chain hinge assembly can be arched in not only one, but two, directions. This allow the chain hinge assembly to take on the shape of a waterdrop which minimizes the height of the chain hinge assembly when folded together.

In a possible implementation form of the first aspect, at least one of the first and second further elements is a third hinge plate comprising two end pivot axes, facilitating a chain hinge assembly which is stable when unfolded while allowing the chain hinge assembly to be folded into a waterdrop shape.

According to a second aspect, there is provided a bi-directional chain hinge assembly comprising a first row of hinge plates, a second row of hinge plates, and at least one plate arrangement according to the above, the plate arrangement comprising a first hinge plate and a second hinge plate, the first row of hinge plates and the second row of hinge plates each comprising at least one third hinge plate, each hinge plate of the first row of hinge plates being pivotally connected to at least one hinge plate of the second row of hinge plates by means of a pivot rod extending along at least one pivot axis, the first row of hinge plates comprising the first hinge plate(s), the second row of hinge plates comprising the second hinge plate(s), the first row of hinge plates being offset in relation to the second row of hinge plates such that a third hinge plate of the first row of hinge plates partially overlaps a second hinge plate or a third hinge plate of the second row of hinge plates.

Such a solution allows for a chain hinge assembly which can be folded together, frame sections of an electronic device, interconnected by the chain hinge assembly, being superimposed onto each other and extending in parallel, while the chain hinge assembly has a waterdrop shape. This maximizes the internal space available within, e.g., two electronic device frame sections interconnected by the chain hinge assembly while minimizing the thickness of the electronic device when the electronic device is folded together.

In a possible implementation form of the second aspect, each hinge plate comprises at least one gear connection meshing with a gear connection of a neighboring hinge plate in the same row of hinge plates, such that neighboring hinge plates are dynamically flexible yet still provide sufficient static support for, e.g., a display extending across the chain hinge assembly.

In a further possible implementation form of the second aspect, the bi-directional chain hinge assembly comprises at least three rows of hinge plates, the rows of hinge plates being arranged such that every other hinge plate row is a first row of hinge plates and every other hinge plate row is a second row of hinge plates, facilitating a chain hinge assembly which has as small outer dimensions as possible, while still being strong enough to allow unrestricted movement of, e.g., two electronic device frame sections, connected by the chain hinge assembly, between unfolded and folded positions.

In a further possible implementation form of the second aspect, at least one pivot rod is connected to a first hinge plate and a second hinge plate along the center pivot axis, facilitating a chain hinge assembly which has as small outer dimensions as possible while still allowing the inner section of the chain hinge assembly to be folded into a waterdrop shape.

In a further possible implementation form of the second aspect, at least one pivot rod is connected to a third hinge plate, along one of the end pivot axes of the third hinge plate, and a second hinge plate, along one end pivot axis of the second hinge plate, facilitating a chain hinge assembly which is stable while still allowing the inner section of the chain hinge assembly to be folded into a waterdrop shape.

In a further possible implementation form of the second aspect, the surface area of the third hinge plate is at least twice as large as the surface area of the first hinge plate, such that there is space enough to accommodate a support rod, used to support a display extending across the chain hinge assembly, the support rod protruding from the hinge plate having the third hinge plate configuration, past the hinge plate having the first hinge plate configuration.

In a further possible implementation form of the second aspect, each hinge plate is at least partially tapered, allowing the chain hinge assembly to fold any components, which the chain hinge assembly interconnects, completely together in one direction.

In a further possible implementation form of the second aspect, the first row of hinge plates comprises at least two intermediate hinge plates arranged such that the tapering is directed in a first direction, and at least one end hinge plate arranged at each end of the first row of hinge plates, arranged such that the tapering is directed in a second direction, opposite to the first direction, facilitating the transition from the water-drop shaped chain hinge assembly to the parallel electronic device frame sections, when the electronic device is in a folded position.

In a further possible implementation form of the second aspect, neighboring pivot rods of the first hinge plate and the third hinge plate are arranged equidistantly, in order to provide the chain hinge assembly with a smooth outer curvature, and hence keeping the display smooth and even, when the electronic device is in a folded position.

According to a third aspect, there is provided a foldable electronic device comprising a first frame section and at least one second frame section, a foldable display attached to a front face of the first frame section and a front face of the second frame section, a plurality of support rods for supporting the foldable display in an area between the first frame section and the second frame section, at least two bi-directional chain hinge assemblies according to the above connecting the first frame section to the second frame section such that the first frame section and the second frame section are pivotable relative each other, the plurality of support rods extending at least partially between the chain hinge assemblies, the second frame section being superimposed on the first frame section when pivoted to a folded end position, the front face of the second frame section being aligned with the front face of the first frame section when pivoted to an unfolded end position.

A foldable electronic device provided with a chain hinge assembly according to the present disclosure allows the electronic device to be folded together such that the frame sections of the electronic device are superimposed onto each other, and extend in parallel, while the folded chain hinge assembly has a waterdrop shape. This maximizes the internal space available within the electronic device frame sections interconnected by the chain hinge assembly while minimizing the thickness of the electronic device when the electronic device is folded together.

In a possible implementation form of the third aspect, each support rod is connected to a hinge plate of the first row of hinge plates or the second row of hinge plates, and borders at least one hinge plate of the second row of hinge plates or the first row of hinge plates, so that the hinge plate(s) of the second row of hinge plates or the first row of hinge plates can fold around the support rod when the first frame section and the second frame section are in the unfolded end position, providing sufficient support for, e.g., a display extending across the chain hinge assembly and the front faces of the frame sections.

In a further possible implementation form of the third aspect, at least one edge of the hinge plate comprises a recess for accommodating a part of a bordering support rod when the first frame section and the second frame section are in the unfolded end position, allowing the support rod to be arranged between neighboring hinge plates and hence keeping the outer dimensions of the chain hinge assembly as small as possible.

In a further possible implementation form of the third aspect, each hinge plate is tapered from a base section to an apex section, the apex sections of the hinge plates being moved towards each other when the first frame section and the second frame section are moved to the folded end position, facilitating a chain hinge assembly which takes up minimal space and which is inherently stable when being folded together.

In a further possible implementation form of the third aspect, at least one third hinge plate and each second hinge plate is connected to one support rod and at least two pivot rods, the pivot rods being arranged closer to the apex section than the support rod, allowing the chain hinge assembly to be folded together in only one direction.

In a further possible implementation form of the third aspect, the first row of hinge plates comprises at least two intermediate hinge plates arranged such that the tapering is directed in a first direction and the pivot rods are arranged closer to the apex section than the support rod, and at least one end hinge plate arranged at each end of the first row of hinge plates, arranged such that the tapering is directed in a second direction, opposite to the first direction, and the pivot rods are arranged closer to the base section than the support rod, facilitating the transition from the water-drop shaped chain hinge assembly to the parallel electronic device frame sections, when the electronic device is in a folded position.

In a further possible implementation form of the third aspect, each first hinge plate is arranged between two third hinge plates, is pivotally connected to a second hinge plate, and is bordering a support rod connected to the second hinge plate, providing an electronic device wherein the frame sections are interconnected by means of a chain hinge assembly having as small outer dimensions as possible while still allowing the inner section of the chain hinge assembly to be folded into a waterdrop shape.

This and other aspects will be apparent from the embodiments described below.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figure 3:
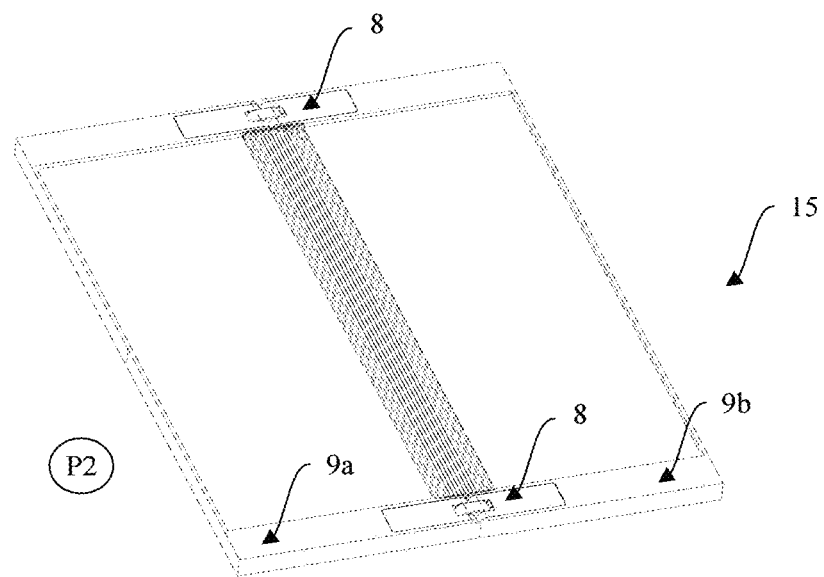
FIG. 3 shows a perspective view of a foldable electronic device in accordance with one embodiment of the present disclosure, the foldable electronic device being in an unfolded position.
Figure 4:
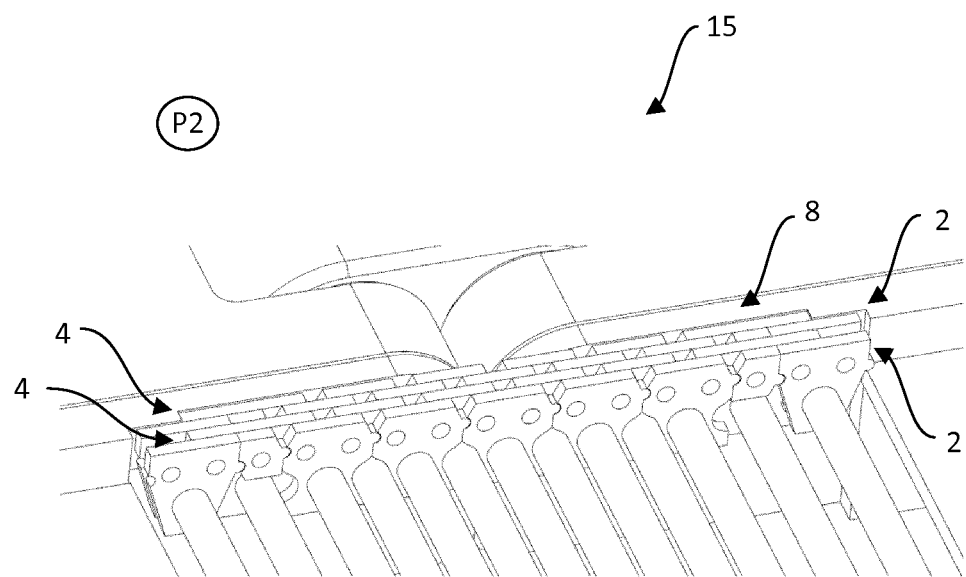
FIG. 4 shows a partial, perspective view of a foldable electronic device in accordance with a further embodiment of the present disclosure, the chain hinge assembly comprising four rows of hinge plates.
Figure 5:
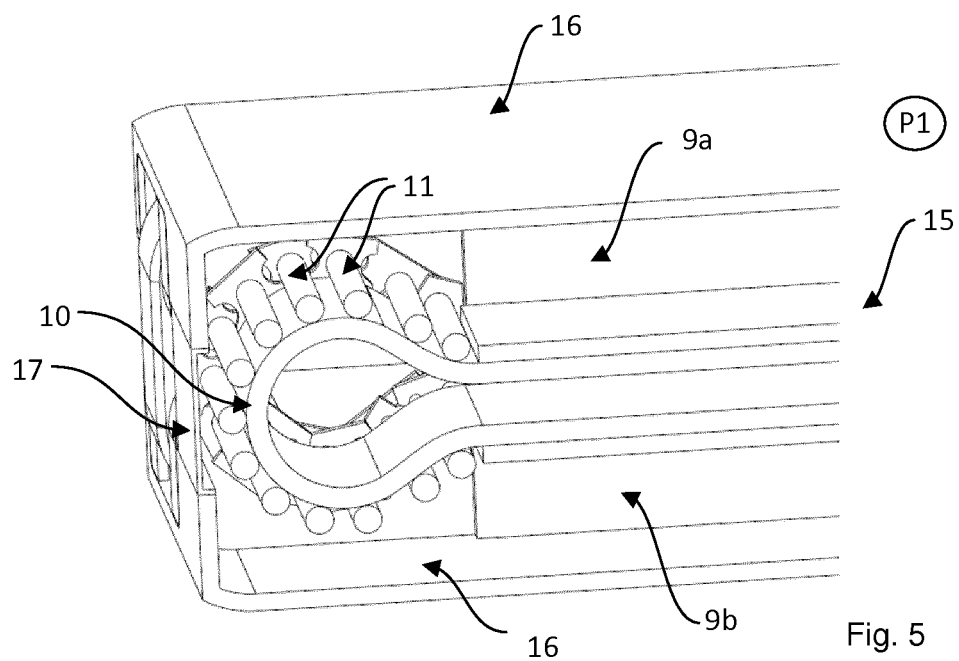
FIG. 5 shows a partial, perspective view of a foldable electronic device in accordance with a further embodiment of the present disclosure, the foldable electronic device being in a folded position.

FIGS. 3 to 5 show a foldable electronic device 15 comprising a first frame section 9a and a second frame section 9b. At least two bi-directional chain hinge assemblies 8, shown in more detail in FIGS. 1A-1D and described in more detail farther below, connect the first frame section 9a to the second frame section 9b such that the first frame section 9a and the second frame section 9b are pivotable relative each other, between a folded end position P1 and an unfolded end position P2. In the folded end position P1, shown in FIG. 5, the second frame section 9b is superimposed on the first frame section 9a. In the unfolded end position P2, shown in FIG. 3, the front face of the second frame section 9b is aligned with the front face of the first frame section 9a.

The foldable electronic device 15 further comprises a foldable display 10, attached to the front face of the first frame section 9a and the front face of the second frame section 9b, and extending across the bi-directional chain hinge assembly 8. A plurality of support rods 11 support the foldable display 10 in the area between the first frame section 9a and the second frame section 9b, as shown in FIG. 5. The plurality of support rods 11 extend at least partially between the chain hinge assemblies 8.

Each support rod 11 may comprise an axial center section and two axial end sections, the axial center section preferably having larger outer dimensions than the axial end sections. The axial sections of the support rod 11 may be cylindrical. The axial center section of the support rod 11 may also be tapered from the base section to the apex section. The widest outer surface of the base section may be convex such that all neighboring support rods 11 together form a semicircular surface when the hinge plates 3b, 3c have been folded around the support rods 11. The tapered shape may be achieved, e.g., by machining a metal rod or by molding plastic over a cylindrical metal rod.

The support rods 11, when mounted in a foldable electronic device 15, extend in parallel with the longitudinal edges of the first frame section 9a and the second frame section 9b, and are adapted for supporting the foldable section of the electronic device 15, e.g. the foldable display 10, as it extends across the gap between the first frame section 9a and the second frame section 9b. The support rods 11 may support the display 10 directly, or support a flexible support sheet arranged to, in turn, support the foldable section of the foldable display 10.

The flexible support sheet, not shown, may rest on the support rods or may enclose the support rods, in which case the support rods are either assembled separately onto the flexible support sheet or insert molded together with the flexible support sheet. The flexible support sheet is preferably made of elastomer or flexible metal.

The foldable electronic device 15 may comprise a spring mechanism, not shown, which is arranged between the first frame section 9a and the bi-directional chain hinge assembly 8, as well as a spring mechanism arranged between the second frame section 9b and the bi-directional chain hinge assembly 8. The flexible spring mechanism allows the distance between the first frame section 9a and second frame section 9b to vary slightly, reducing the stress on the foldable display 10 as it is being folded or unfolded.

As shown in FIG. 5, the first frame section 9a may be a hollow housing which comprises the internal components of the foldable electronic device 15, such as battery, circuit board, etc., and the second frame section 9b may be either a similar hollow housing or a solid support plate. Furthermore, the foldable electronic device 15 may comprise two second frame sections 9b, one arranged at each longitudinal edge of the first frame section 9a. FIG. 5 furthermore discloses optional back covers 16, being part of the first frame section 9a and the second first frame section 9b, as well as an elastomer 17 covering the space between the first frame section 9a and the second first frame section 9b, indicated at the far left of FIG. 5.

FIGS. 1A-1D and 2A-2B show the chain hinge assembly 8, as well as a plate arrangement 1, in more detail.

The plate arrangement 1 comprises a first hinge plate 3a, comprising one center pivot axis 5a, and a second hinge plate 3b, comprising a center pivot axis 5a and two end pivot axes 5b, 5c. The end pivot axes 5b, 5c are arranged at opposite sides of the center pivot axis 5a. In addition, the first end pivot axis 5b is arranged near a first edge 7a of the second hinge plate 3b, and the second end pivot axis 5c is arranged near a second edge 7b of the second hinge plate 3b. In other words, the first end pivot axis 5b is arranged in an area located between the center pivot axis 5a and the first edge 7a of the second hinge plate 3b, and the second end pivot axis 5c is arranged in an area located between the center pivot axis 5a and the second edge 7b of the second hinge plate 3b. By "near" is meant that the end pivot axis 5b is arranged closer to the first edge 7a of the second hinge plate 3b than the center pivot axis 5a, and that the end pivot axis 5c is arranged closer to the second edge 7b of the second hinge plate 3b than the center pivot axis 5a.

The first hinge plate 3a and the second hinge plate 3b are pivotally interconnected such that the center pivot axis 5a of the first hinge plate 3a coincides with the center pivot axis 5a of the second hinge plate 3b.

The end pivot axes 5b, 5c of the second hinge plate 3b are furthermore adapted for pivotally connecting to first and second further elements. The first and second further elements may be a third hinge plate 3c comprising two end pivot axes 5b, 5c, as shown in FIG. 2B, or it may be a connection to a frame section 9a, 9b.

The second hinge plate 3b and the first and second further elements may be interconnected such that the first and second further elements pivot in the same direction, in relation to the second hinge plate 3b, which is a direction opposite to the pivoting direction of the first hinge plate 3a. As shown in FIG. 2B, the second hinge plate 3b is connected to adjacent third hinge plates 3c along both end pivot axes 5b, 5c. The wo third hinge plates 3c can be pivoted in the same direction, as indicated by the arrows of FIG. 2B, in relation to the second hinge plate 3b when the second hinge plate 3b is considered to not pivot. This is possible due to the first hinge plate 3a which is arranged between the two third hinge plates 3c. As seen in FIG. 2B, the first hinge plate 3a is pivoted in a direction opposite to the pivoting direction of the third hinge plates 3c. When the third hinge plates 3c are pivoted in the same direction, and the first hinge plate 3a is pivoted in the opposite direction, the curvature of the arched, bi-directional chain hinge 8 changes, from convex to concave, as seen more clearly in FIGS. 2A and 5.

Figure 2A:
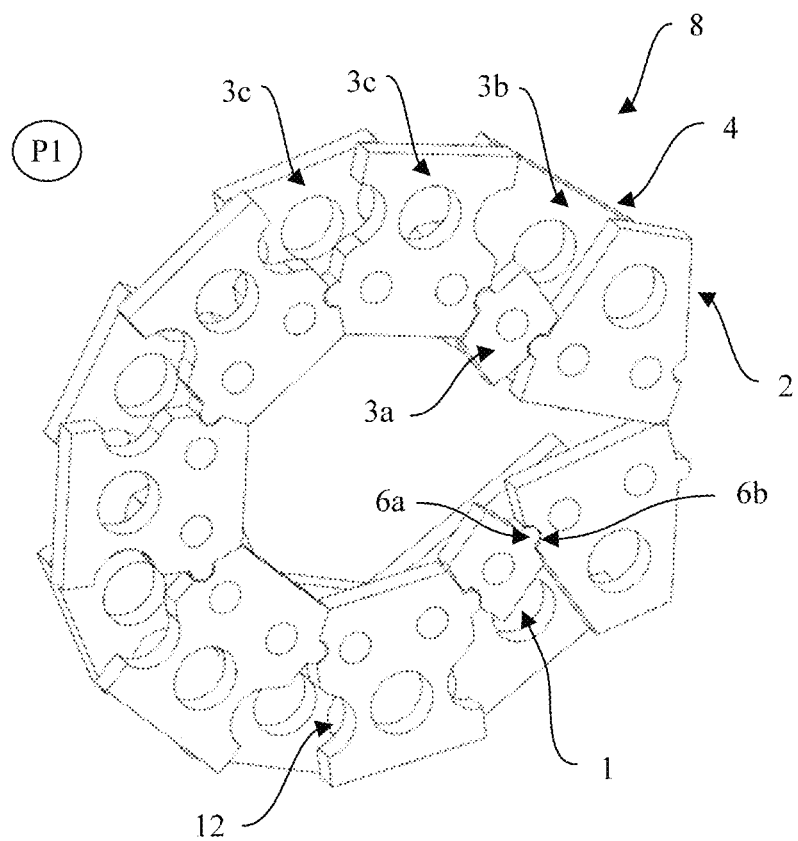
FIG. 2A shows a perspective view of a chain hinge assembly in accordance with the embodiment of FIGS. 1A-1C, the chain hinge assembly being in a folded position.
Figure 2B:
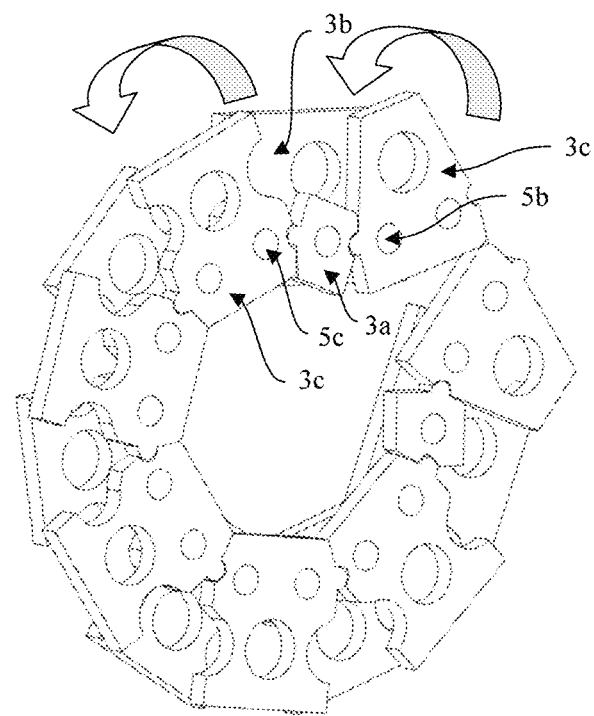
FIG. 2B shows a further perspective view of the embodiment of FIG. 2A.

When the third hinge plates 3c are pivoted in the same direction, and the first hinge plate 3a is pivoted in the opposite direction, the curvature of the arched, bi-directional chain hinge 8 changes, from convex to concave, as seen more clearly in FIGS. 2a and 5.

The chain hinge assembly 8 comprises a first row 2 of hinge plates 3 and a second row 4 of hinge plates 3. Each hinge plate 3 of the first row 2 of hinge plates is pivotally connected to at least one hinge plate 3 of the second row 4 of hinge plates by means of a pivot rod 5 extending along at least one pivot axis 5a, 5b, 5c.

Each hinge plate 3 has one of three individual hinge plate configurations, the hinge plate configurations being a first hinge plate configuration comprising one center pivot axis 5a, a second hinge plate configuration comprising two end pivot axes 5b, 5c, or a third hinge plate configuration comprising three pivot axes 5a, 5b, 5c, i.e. one center pivot axis 5a and two end pivot axes 5b, 5c.

Figure 1A:
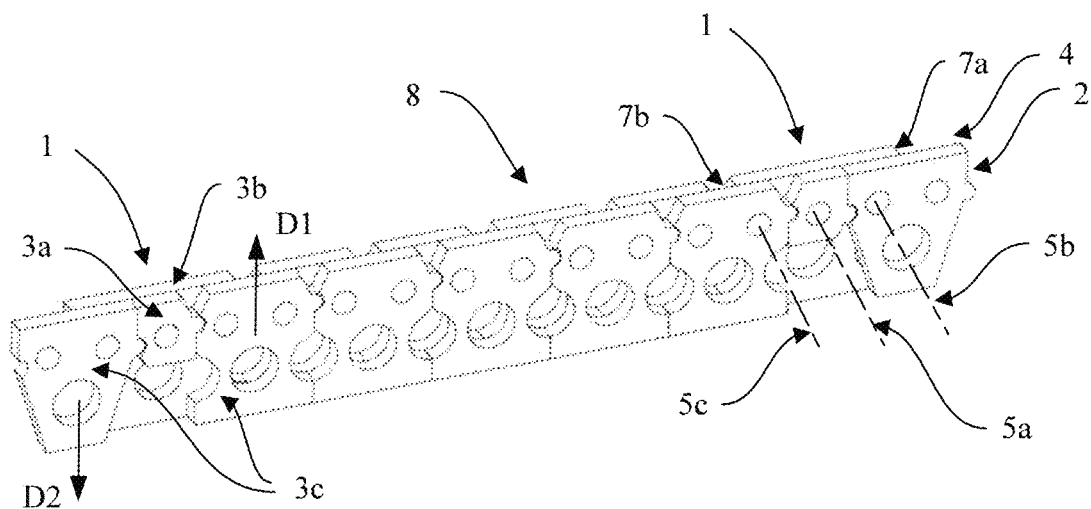
FIG. 1A shows a perspective view of a plate arrangement and a chain hinge assembly in accordance with embodiments of the present disclosure, the chain hinge assembly being in an unfolded position.
Figure 1B:
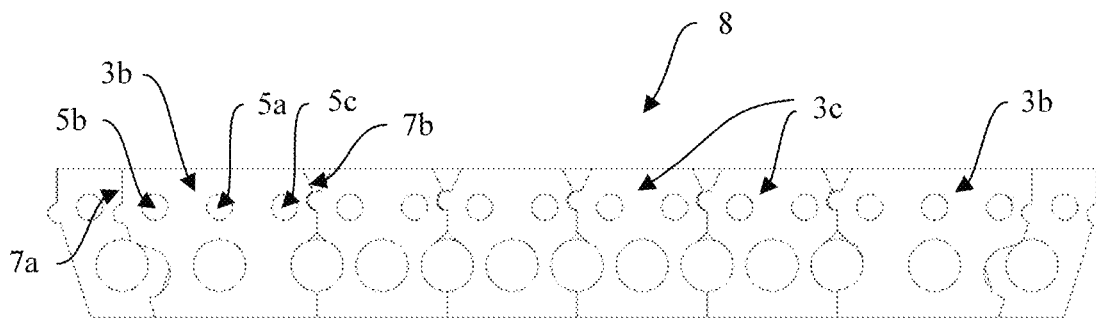
FIG. 1B shows a first side view of the embodiments of FIG. 1A.
Figure 1C:
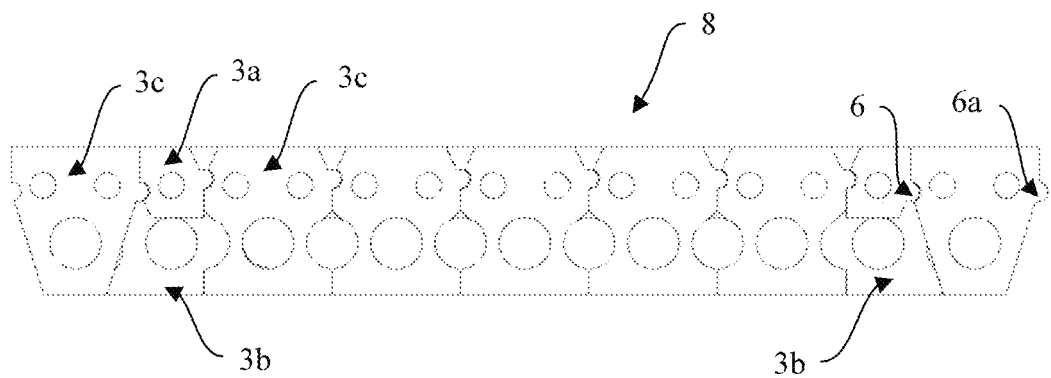
FIG. 1C shows a second side view of the embodiments of FIGS. 1A and 1B.
Figure 1D:
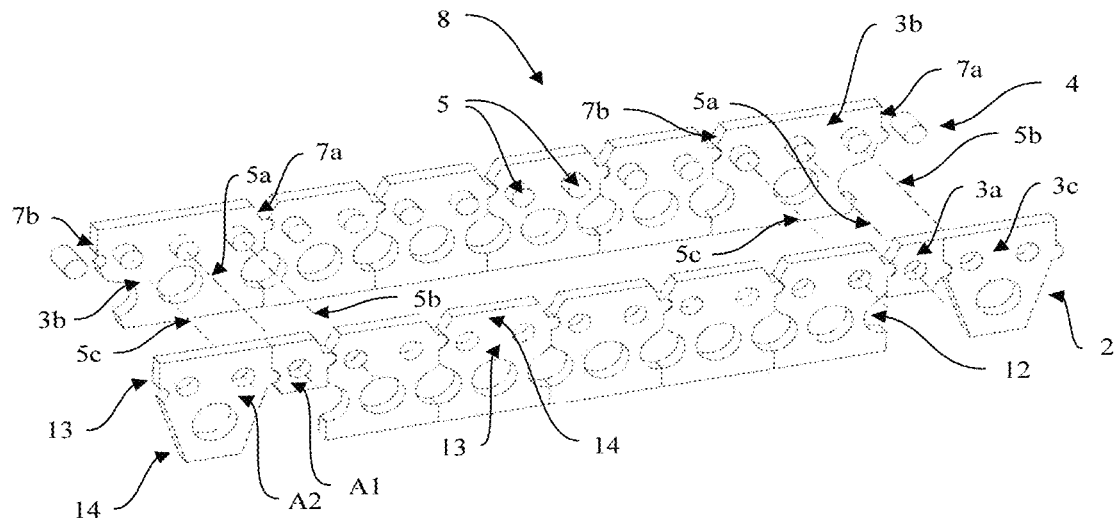
FIG. 1D shows an exploded perspective view of the embodiments of FIGS. 1A-1C.

The first row 2 of hinge plates comprises at least one first hinge plate 3a, having one center pivot axis 5a, and at least one third hinge plate 3c, having two end pivot axes 5b, 5c but no center pivot axis, as shown best in FIG. 1D. Similarly, the second row 4 of hinge plates comprises at least one second hinge plate 3b, having two end pivot axes 5b, 5c and a center pivot axis 5a, and at least one third hinge plate 3c, having two end pivot axes 5b. 5c but no center pivot axis.

The first row 2 of hinge plates is offset in relation to the second row 4 of hinge plates such that a third hinge plate 3c of the first row 2 of hinge plates partially overlaps a second hinge plate 3b or a third hinge plate 3c of the second row 4 of hinge plates.

Each second hinge plate 3b is pivotally connected to one first hinge plate 3a and at least one third hinge plate 3c.

Each hinge plate 3 comprises at least one gear connection 6a meshing with a gear connection 6b of a neighboring hinge plate 3 in the same row 2, 4 of hinge plates. The gear connection 6a, 6b may comprise cogs, i.e. interacting teeth and recesses.

In one embodiment, see FIG. 4, the bi-directional chain hinge assembly 8 comprises at least three rows 2, 4 of hinge plates, the rows 2, 4 of hinge plates being arranged such that every other hinge plate row is a first row 2 of hinge plates and every other hinge plate row is a second row 4 of hinge plates.

Each pivot rod 5 is connected to one hinge plate 3 in each row 2, 4 of hinge plates, along at least one of the pivot axes 5a, 5b, 5c, as shown schematically in FIG. 1D.

At least one pivot rod 5 is connected to a first hinge plate 3a and a second hinge plate 3b along the common center pivot axis 5a.

Furthermore, at least one pivot rod 5 is connected to a third hinge plate 3c along one of the end pivot axes 5b, 5c, and a second hinge plate 3b along one end pivot axis 5c, 5b near one of a first edge 7a and a second edge 7b of the second hinge plate 3b.

The surface area A2 of the third hinge plate 3c is at least twice as large as the surface area A1 of the first hinge plate 3a. Furthermore, each hinge plate 3 is at least partially tapered.

The first row 2 of hinge plates comprises at least two intermediate hinge plates 3 arranged such that the tapering is directed in a first direction D1, and at least one end hinge plate 3 arranged at each end of the first row 2 of hinge plates, arranged such that the tapering is directed in a second direction D2, opposite to the first direction D1.

Neighboring pivot rods 5 of the first hinge plate 3a and the third hinge plate 3c may be arranged equidistantly.

In one embodiment of the present disclosure, each support rod 11 is connected to a hinge plate 3 of the first row 2 or second row 4 of hinge plates, and borders at least one hinge plate 3 of the second row 4 of hinge plates or the first row 2 of hinge plates. Hence, the hinge plates of the second row 4 or first row 2 of hinge plates can fold around the support rod 11 when the first frame section 9a and the second frame section 9b are in the unfolded end position P2, as shown schematically in FIGS. 1A-1D.

At least one edge 7a, 7b of the hinge plate 3b, 3c may comprise a recess 12 for accommodating a part of a bordering support rod 11 when the first frame section 9a and the second frame section 9b are in the unfolded end position P2.

Each hinge plate 3 is tapered from a base section 13 to an apex section 14. The apex sections 14 of neighboring hinge plates 3 are moved towards each other when the first frame section 9a and the second frame section 9b are moved to the folded end position P1.

At least one third hinge plate 3c and each second hinge plate 3b is connected to one support rod 11 and at least two pivot rods 5, the pivot rods 5 being arranged closer to the apex section 14 than the support rod 11.

The first row 2 of hinge plates may comprise at least two intermediate hinge plates 3 and at least one end hinge plate 3 arranged at each end of the first row 2 of hinge plates. The two intermediate hinge plates 3 are arranged such that their tapering is directed in a first direction D1 and the pivot rods 5 are arranged closer to the apex section 14 than the support rod 11. The end hinge plates 3 are arranged such that the tapering is directed in a second direction D2, opposite to the first direction D1, and the pivot rods 5 are arranged closer to the base section 13 than the support rod 11.

Each first hinge plate 3a may be arranged between two third hinge plates 3c. The first hinge plate 3a is pivotally connected to a second hinge plate 3b, and is furthermore bordering a support rod 11 connected to the second hinge plate 3b.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

The invention claimed is:
1. A bi-directional chain hinge assembly comprising:
a first row of hinge plates comprising:

a first hinge plate comprising a first center pivot axis; and two second hinge plates coupled to the first hinge plate on respective ends of the first hinge plate; and a second row of hinge plates coupled to the first row of hinge plates and comprising:

a third hinge plate coupled to the first hinge plate and comprising:

a second center pivot axis, wherein the first hinge plate and the third hinge plate are pivotally interconnected such that the first center pivot axis coincides with the second center pivot axis;

two end pivot axes arranged at opposite sides of the second center pivot axis; and a first pivot rod extending along the second center pivot axis or the two end pivot axes and configured to pivotally connect the third hinge plate to the first hinge plate or the two second hinge plates, wherein, when rotating in relation to the third hinge plate, the two second hinge plates are configured to pivot in a first direction with respect to the third hinge plate, and the first hinge plate is configured to pivot in a second direction with respect to the third hinge plate and opposite to the first direction, and wherein the first row is offset in relation to the second row such that one of the two second hinge plates partially overlaps the third hinge plate.

2. The bi-directional chain hinge assembly of claim 1, wherein the first hinge plate, the two second hinge plates, and the third hinge plate each comprises a gear connection meshing with a gear connection of a neighboring hinge plate.

3. The bi-directional chain hinge assembly of claim 1, wherein the first row is a first type and the second row is a second type, wherein the bi-directional chain hinge assembly further comprises a plurality of rows of hinge plates comprising a plurality of types, and wherein the types alternate between the first type and the second type.

4. The bi-directional chain hinge assembly of claim 1, wherein the first pivot rod is connected to the first hinge plate along the first center pivot axis and the second center pivot axis.

5. The bi-directional chain hinge assembly of claim 1, wherein the first pivot rod is connected to one of the two second hinge plates along one of the two end pivot axes.

6. The bi-directional chain hinge assembly of claim 1, wherein a surface area of any of the second hinge plates is at least twice as large as a surface area of the first hinge plate.

7. The bi-directional chain hinge assembly of claim 1, wherein the first hinge plate, the two second hinge plates, and the third hinge plate are at least partially tapered.

8. The bi-directional chain hinge assembly of claim 7, wherein the first row further comprises:

at least two intermediate hinge plates arranged such that the at least two intermediate hinge plates are tapered in a first direction; and at least one end hinge plate arranged at each end of the first row such that the at least two intermediate hinge plates are tapered in a second direction, wherein the second direction is opposite to the first direction.

9. The bi-directional chain hinge assembly of claim 1, wherein any of the two second hinge plates comprises a second pivot rod, wherein the second pivot rod and the first pivot rod are neighboring pivot rods and arranged equidistantly.

10. The bi-directional chain hinge assembly of claim 1, wherein the first row and the second row are configured to connect a first frame section to a second frame section of a foldable display such that the first frame section and the second frame section are pivotable relative to each other.

11. The bi-directional chain hinge assembly of claim 10, wherein the first row and the second row are configured to connect the first frame section to the second frame section such that the first frame section and the second frame section are pivotable relative to each other.

12. The bi-directional chain hinge assembly of claim 10, wherein the second frame section is superimposed on the first frame section when the first row of hinge plates and the second row of hinge plates pivot to a folded end position, and wherein a second front face of the second frame section is aligned with a first front face of the first frame section when the first row of hinge plates and the second row of hinge plates pivot to an unfolded end position.

13. The bi-directional chain hinge assembly of claim 12, further comprising a plurality of support rods coupled to the foldable display and configured to support the foldable display in an area between the first frame section and the second frame section, and wherein the support rods extend at least partially between the first row and the second row.

14. The bi-directional chain hinge assembly of claim 13, wherein each of the support rods is connected to the first row, wherein each support rod of the support rods is configured to border the second row such that the second row is configured to fold around the support rod when the first frame section and the second frame section are in the unfolded end position.

15. The bi-directional chain hinge assembly of claim 12, wherein the first hinge plate, the two second hinge plates, and the third hinge plate each comprises an edge comprising a recess configured to accommodate a part of a bordering support rod when the first frame section and the second frame section are in the unfolded end position.

16. The bi-directional chain hinge assembly of claim 12, wherein the first hinge plate, the two second hinge plates, and the third hinge plate each comprises a base section and an apex section and is tapered from the base section to the apex section, and wherein the apex section is configured to move towards another apex section of a neighboring hinge plate when the first frame section and the second frame section move to the folded end position.

17. The bi-directional chain hinge assembly of claim 16, wherein the second hinge plate and the third hinge plate are connected to a support rod and at least two pivot rods, wherein a first distance between the at least two pivot rods and the apex section is less than a second distance between the at least two pivot rods and the support rod.

18. The bi-directional chain hinge assembly of claim 17, wherein the first row further comprises:

at least two intermediate hinge plates arranged such that the at least two intermediate hinge plates are tapered in a first direction; and at least one end hinge plate arranged at each end of the first row such that the at least two intermediate hinge plates are tapered in a second direction, wherein the first direction is opposite to the second direction, and wherein a third distance between the at least two pivot rods and the base section is less than the second distance.

19. A chain hinge assembly comprising:

a first hinge plate comprising a first center pivot axis;

a first adjacent second hinge plate coupled to a first end of the first hinge plate;

a second adjacent second hinge plate coupled to a second end of the first hinge plate; and a third hinge plate coupled to the first hinge plate and comprising:
  a second center pivot axis; and
  two first end pivot axes arranged at opposite sides of the second center pivot axis,
wherein the first hinge plate and the third hinge plate are pivotally interconnected such that the first center pivot axis coincides with the second center pivot axis,
wherein the first hinge plate is configured to pivot in a first direction with respect to the third hinge plate, and
wherein the two first end pivot axes are configured to pivotally connect to the first adjacent second hinge plate and the second adjacent second hinge plate such that the first adjacent second hinge plate and the second adjacent second hinge plate pivot in a second direction which is opposite of the first direction with respect to the third hinge plate.

20. The chain hinge assembly of claim 19, wherein the first adjacent second hinge plate or the second adjacent second hinge plate comprises two second end pivot axes.

* * * * *